Figure 1:
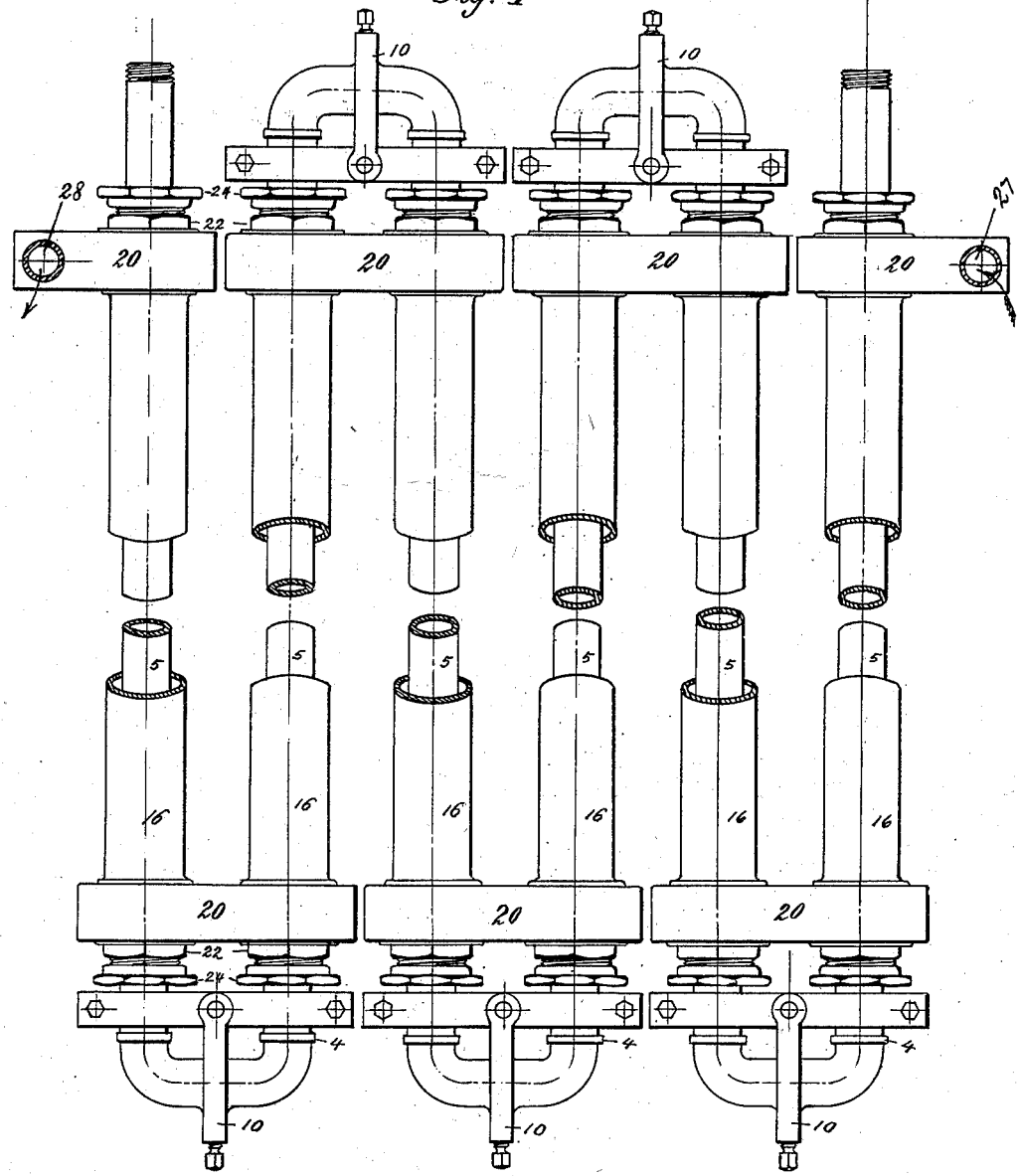

No. 749,886. PATENTED JAN. 19, 1904.
H. STIER.
FLUID CIRCULATING APPARATUS.
APPLICATION FILED JUNE 6, 1903.
NO MODEL. 3 SHEETS—SHEET 1.

No. 749,886. PATENTED JAN. 19, 1904.
H. STIER.
FLUID CIRCULATING APPARATUS.
APPLICATION FILED JUNE 6, 1903.
NO MODEL. 3 SHEETS—SHEET 2.
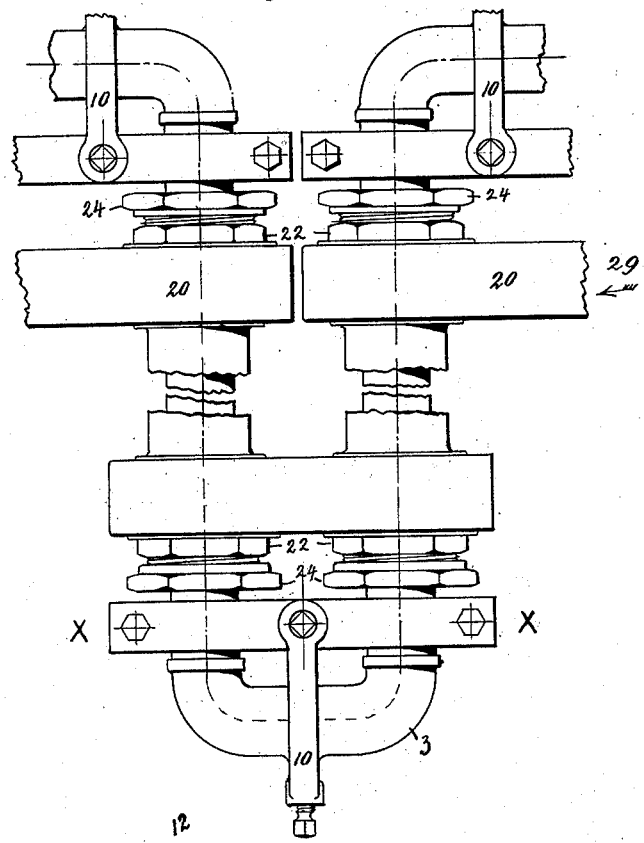
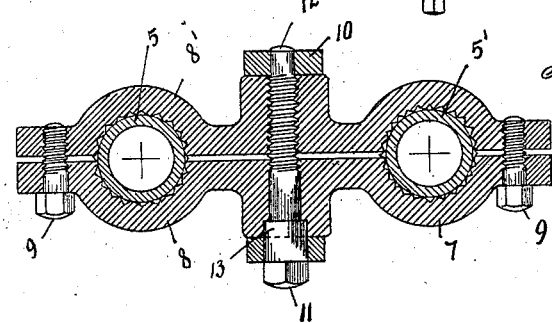
WITNESSES:
Edgar J. Stewart
Wm M Kingsley
INVENTOR
Herman Stier
BY
ATTORNEY No. 749,886. Patented January 19, 1904.

UNITED STATES PATENT OFFICE.

HERMAN STIER, OF CHICAGO, ILLINOIS.

FLUID-CIRCULATING APPARATUS.

SPECIFICATION forming part of Letters Patent No. 749,886, dated January 19, 1904.

Application filed June 6, 1903. Serial No. 160,303. (No model.)

*To all whom it may concern:*

Be it known that I, HERMAN STIER, a citizen of the United States, residing in Chicago, in the county of Cook and State of Illinois, have invented certain new and useful Improvements in Fluid-Circulating Apparatus, of which the following is a specification.

This invention relates to circulating systems for fluids, and has particular reference to joints for and connections between double-pipe conduits, one within the other, for conveying different kinds of fluids—such as, for instance, ammonia in one conduit and brine in the other—for cooling, heating, freezing, producing changes in one fluid by means of another.

The object of the invention is generally to provide convenient, readily-accessible, and tight connections between jacket-pipes and the pipes surrounded thereby, as well as connections between the latter, permitting the ready removal therefrom of the former for the purpose of repairing, renewing, or cleaning any or all of the pipes comprising the system; and the invention consists in the novel features of construction and arrangements of parts hereinafter described in detail, illustrated in the drawings, and incorporated in the claims.

The invention will be more readily understood by reference to the accompanying drawings, forming a part of this specification, and in which—

Figure 4:
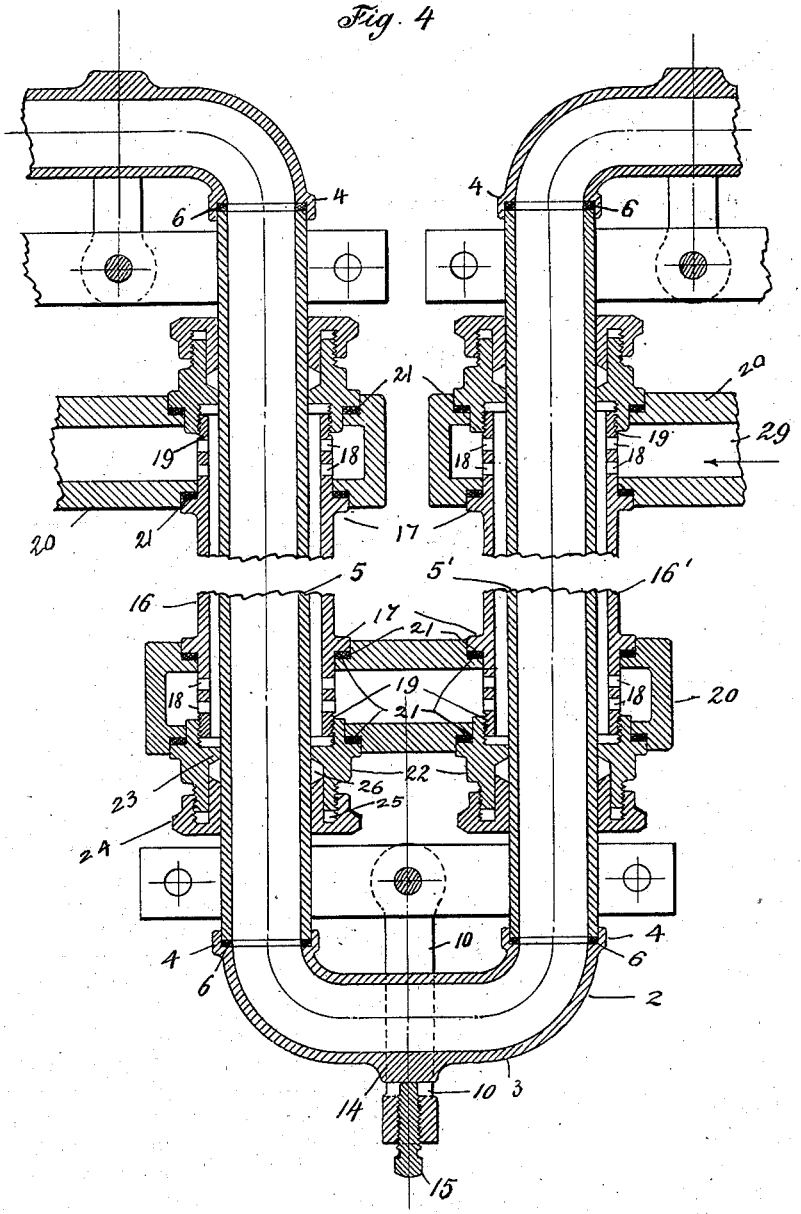

Figure 1 is an elevation of a system of pipes with a portion broken away embodying my novel details of construction. Fig. 2 is an enlarged view of a portion of the system shown in Fig. 1. Fig. 3 is a horizontal section through one of the clamps and yoke for the adjacent ends of the inner pipe, same being an enlarged view taken substantially on the line $x\,x$ of Fig. 2. Fig. 4 represents substantially a vertical section through Fig. 2 on an enlarged scale.

In the drawings, 2 represents one of the bends in the system of pipes and including only the inner pipes. Same consists of a bent pipe 3, provided at its ends with hubs 4 fitting the ends of the inner pipes 5 5', between the latter and said bend being fiber rings or gaskets 6. This pipe bend is secured to the pipes 5 and 5' by means of a clamp 7, consisting of two members 8 and 8', curved at their ends to embrace opposite sides of the pipes. These members are clamped together and to the pipes by means of screws 9, passing through the member 8 and having threaded engagement with the member 8'. The middle portions of the members 8 and 8' are outwardly enlarged and carry a yoke 10, pivoted thereupon by means of a screw 11, having a head at one end and a journal portion 12 at the other end. As shown, this screw has threaded engagement with the member 8' and has a collar 13 shrunk upon it to prevent its binding the yoke against free pivotal movement when the screw 11 is tightened. The curved pipe-section 3 is also provided with a projection or boss 14, against which the screw 15 in the yoke is set. By simply loosening the latter the yoke may be turned to one end of the pipe-section 3 to release the latter from the ends of pipes 5 and 5'.

16 16' represent the outer pipes, each provided at its ends with flanges 17, which may be rings shrunk upon the pipes or secured thereto in any suitable manner by welding, soldering, casting, or otherwise. Between the flanges 17 and the outer ends of the pipes the latter have a series of apertures 18, which may be provided in any suitable number, and the forms thereof are not essential. On the extreme ends of the pipes 16 16' are male threads 19. These pipes are connected at their ends by means of a preferably rectangular box 20, having counterbored apertures at its ends, making openings through the box for the pipes 16 16' and providing in the counterbores seats for the flanges 17 and fiber rings 21. The apertures in one side of the box are slightly larger than those in the other side to provide room for threaded collars 22, having female threads engaging the threads 19. The threaded collars 22, together with the fiber rings between same and the box, provide a liquid and gas tight junction between collar and box and serve to draw the latter tightly against the ends of pipes 16 16' or the flanges 17 and fiber rings between said flanges and box, but not between the collars 22 and the pipes 16 16'. To provide a tight junction between the latter, I have provided internal flanges 23 upon the collars 22, bearing against the pipes, and an annular nut 24, having a circular groove 25 for the rim of the collar 22. Between the flange 23 and the inner rim of the nut 24 is a fiber ring 26. Said inner rim, as well as its opposing flange 23, are beveled, as shown, to wedge the fiber ring 26 tightly against the pipe 16 or pipe 16'.

The parts are assembled by slipping the pipes 16 and 16' over the pipes 5 and 5'. The boxes 20 are then slipped over the pipes 5 5' and 16 16' against the flanges 17 of the latter after having first mounted the fiber rings 21 thereupon. The threaded collars 22 are then threaded upon the ends of the pipes 16 16' with fiber washers between said collars and box. Next the fiber rings 26 are slipped upon the pipes 5 5' and thereupon the annular nuts 24, engaging the male threads upon the collars 22. Finally the clamps 7 are clamped upon the ends of pipes 5 5' and the yoke 10 fixed against the boss 14, as previously described.

The circulation of the fluid through pipes 5 and 5' and the curved section 3 thereof is too obvious to require description, said pipes and section constituting a plain conduit the course of which is plainly shown in the large Fig. 4.

Referring to the circulation through the outer or jacket pipes 16 and 16', in Fig. 1 the inlet to the outer circulation is shown at 27 in one of the boxes 20 and the outlet from a similar box at 28. 29 in Fig. 4 represents the interior of box 20, in which inlet 27 is shown in Fig. 1. The course of the fluid is indicated by the arrow at 29, and from the box the fluid enters the upper end of pipe 16' through the apertures 18, passing downwardly through said pipe and out at the lower end thereof through corresponding apertures 18, thence through the lower box, Fig. 4, through the lower apertures 18 in the pipe 16, and out of the upper apertures 18 into the third box or the upper box surrounding pipe 16, and so on repeatedly through the system of pipes, as shown in Fig. 1, to the final outlet 28.

Should the outer pipes 16 and 16' become clogged with sediment, the collars and nuts on the ends thereof may be loosened without disturbing the inner system of pipes and cleaned with a spray of water from a hose. The inner pipes may also be made accessible without disturbing the outer pipes by simply loosening the screw 15, turning down the yoke, and removing the pipe bend 3, and all of the pipes may be very quickly taken apart and put together again by any one whether skilled or not. This is a distinct advantage in shipping the system to distant points, where experts are not available, and the different parts are so related as to require only the most ordinary adjustment with relation to each other and to secure absolutely tight joints through the medium of ordinary fiber rings, which are securely confined between the flanges and rings and counterbored portions, so that all the spread thereof under pressure will contribute to close the respective joints.

As my invention is capable of variations in the minor details thereof by one skilled in the art, I do not wish to confine same to the specific construction herein shown and described.

Having thus described my invention, I claim as new and desire to secure by Letters Patent—

1. In a circulating system, the combination of a hollow pipe connection closed at one end and having a transverse opening extending through opposite walls of said connection, said opening being counterbored in each of the opposite walls of said connection, an outer pipe provided with a flange near its outer end occupying one of said counterbores and suitable lateral openings communicating with the interior of said connection, a fiber ring between said counterbore and flange, an inner pipe projecting through said outer pipe, a collar surrounding said inner pipe, said collar having a flange surrounding the end of said outer pipe and having threaded engagement therewith, and having also an interior flange engaging said inner pipe, a fiber ring between said collar and the opposite counterbore, an annular nut having threaded engagement with said collar and a projecting flange between the latter and said inner pipe, and a fiber ring between the end of said flange and said interior flange.

2. In a circulating system, the combination of a hollow pipe connection having a transverse pipe opening at each end extending through opposite walls thereof, a pair of outer pipes having their ends mounted within said connection and provided with lateral apertures in said ends, an inner pipe extending through each of said outer pipes, a pair of clamps upon the ends of said inner pipes, a bent pipe-section connecting said ends, a forked yoke pivoted upon said clamps between said inner pipes, a set-screw having threaded engagement with the crotch of said yoke and adapted to clamp said pipe-section against the ends of said inner pipes, and means for simultaneously sealing each pipe-opening between the edges thereof, the outer walls and ends of said outer pipe and the outer walls of said inner pipes.

3. In a circulating system, the combination with a pair of parallel pipes, of a pipe-section connecting the ends of said pipes, a pair of clamps between said pipes engaging opposite sides thereof, a forked yoke pivoted upon said clamps and straddling said pipe-section and a set-screw in the crotch of said yoke for clamping said pipe-section upon the ends of said pipes.

In testimony whereof I have hereunto set my hand in the presence of two subscribing witnesses.

HERMAN STIER.

In presence of—
  ROBT. KLOTZ,
  LULU E. MCCORMICK.